United States Patent [19]
Muller

[11] 3,907,535

[45] Sept. 23, 1975

[54] PROCESS OF MAKING A PARTIALLY CRYSTALLIZABLE SEAL

[75] Inventor: Gerd Muller, Mainz-Weisenau, Germany

[73] Assignee: Jenaer Glaswerk Schott & Gen., Mainz, Germany

[22] Filed: Mar. 21, 1974

[21] Appl. No.: 453,488

[30] Foreign Application Priority Data
Mar. 21, 1973 Germany............................ 2313993

[52] U.S. Cl. ........................ 65/33; 65/43; 106/39.6
[51] Int. Cl.² ............... C03B 32/00; C03C 27/00; C03C 3/22
[58] Field of Search ................ 65/33, 43; 106/39.6

[56] References Cited
UNITED STATES PATENTS

| | | | |
|---|---|---|---|
| 3,291,586 | 12/1966 | Chapman, Jr. et al. ................ | 65/43 |
| 3,462,252 | 8/1969 | Veres..................................... | 65/33 |
| 3,715,196 | 2/1973 | Montierth .............................. | 65/43 |
| 3,734,702 | 5/1973 | Veres..................................... | 65/43 |
| 3,778,242 | 12/1973 | Francel et al........................... | 65/43 |

Primary Examiner—S. Leon Bashore
Assistant Examiner—Frank W. Miga
Attorney, Agent, or Firm—Millen, Raptes & White

[57] ABSTRACT

Soldering glass compositions which can be soldered to form airtight joints having a high mechanical strength are provided by employing an admixture of a thermally devitrifiable solder glass and an inert refractory compound having a negative coefficient of thermal expansion which are characterized by precipitating crystals upon soldering in a volume not greater than half the soldering glass volume, thereby avoiding the adverse effects of crystallization on flowability of the soldering composition and permitting loading with high proportions of the refractory compound.

7 Claims, No Drawings

PROCESS OF MAKING A PARTIALLY CRYSTALLIZABLE SEAL

BACKGROUND OF THE INVENTION

This invention relates to brazing or soldering glass compositions of solder glasses having a low softening point, which precipitate a small amount of crystals during the soldering process, and inert substances having a negative coefficient of thermal expansion.

There is usually a connection between the thermal expansion of a glass solder and the soldering temperature, i.e. the temperature at which the glass solder flows sufficiently and wets the components to be joined. The lower the thermal expansion, the higher the required soldering temperature. A somewhat lower thermal expansion at a given soldering temperature can be obtained in certain cases with crystallizing glass solders, i.e., those which are crystallized following the flowing and wetting process; the properties of these solders are determined essentially by the types of crystals formed. However, experience has shown that the heretofore known crystallizing glass solders also fit into the above general relationship between soldering temperature and thermal expansion.

For this reason, several glass soldering problems could heretofore be solved only very unsatisfactorily. For example, electronic components are frequently encapsulated into ceramic housings of aluminum oxide due to its high thermal conductivity. For hermetically sealing the housings, glass solders are utilized which, for reasons of gas impermeability and mechanical strength, must correspond in their thermal expansion to that of the aluminum oxide (approximately $70 \cdot 10^{-7}$/degree). The soldering temperatures are in this case limited by the amount of stress to which the enclosed electronic component can be exposed. Therefore, frequently temperatures of up to only about 450° C. can be employed. It has heretofore only been possible with conventional crystallizing glass solders to attain soldering temperatures in the proximity of 500° C. with technically usable soldering times.

Another example is that a number of glasses, e.g. glasses for laboratory glassware, have expansions around 30 to $50 \cdot 10^{-7}$/degree and glass transformation temperatures around 550° C. If component surfaces of such glasses are to be joined by a solder glass, the soldering temperature generally should not exceed the transformation temperature of the glass, or in any event must not pass substantially beyond this temperature if deformation of the components to be soldered together is to be avoided.

Solder glasses which flow sufficiently well at about 550° C. normally have higher expansions than these glasses used for laboratory glassware. Therefore, it is at best possible in such systems to produce bonds wherein the solder layer is under dangerously high mecahnical tensile stresses.

One known method for changing the thermal expansion of a given glass solder is to admix fine-grained, inert substances having a lower thermal coefficient of expansion with the solder glass powder, e.g., according to U.S. Pat. No. 3,250,631. During the soldering step, the admixed grains of refractory metal oxide are closely encompassed by the solder glass, so that a composite body is produced which correspondes approximately to concrete or a sand-containing mortar. This comparison applies particularly if a crystallizing glass solder is involved.

Such mixed solders of crystallizing glass solders and inert refractory particles having a lower thermal expansion than the glass solder are frequently utilized. However, their usefulness is restricted by the fact that the admixture of solid components necessarily increases the apparent viscosity of a solder, so that the flow behavior is impaired. Additionally, in the case of most crystallizing glass solders, the admixed grains strongly stimulate crystallization, consequently reducing the flowing and wetting power of the solder. This imposes a rather strict limitation on the maximum permissible amount of refractory particles added to the admixtures and therefore also limits the effect thereof on the total thermal expansion of the mixture.

With the use of noncrystallizing glass solders, the above crystallization difficulties can be circumvented. By the use of noncrystallizing glass solders having a very low softening point and therefore excellent flow characteristics, it is also possible to employ higher proportions of admixed inert substances. However, as mentioned above, these solders also exhibit the highest thermal expansions. Preliminary experiments have shown that this disadvantage is more than compensated for by the advantage of larger contents of refractory substances having a negative thermal expansion, such as the beta-eucryptite, i.e., $LiAlSiO_4$.

However, additional experiments have established that such mixtures of noncrystallizing glass solders having a low softening point and beta-eucryptite or similar substances are normally unsuitable from a technical standpoint. For example, if beta-eucryptite is used as the refractory component in the admixture, the difference between the thermal expansion coefficients of the mixture components is about 150 to $200 \cdot 10^{-7}$/degree. During cooling after the soldering step, intolerably high mechanical stresses are produced, apparently between the mixture components, having the effect that the solder glass is ruptured in the proximity of the beta-eucryptite grains and a system of coherent cracks is formed in the solder mixture element. Such an element has an extremely low mechanical strength and is not gastight.

OBJECTS OF THE INVENTION

Accordingly, it is a general object of this invention to provide brazing or soldering glass compositions having improved physical and mechanical properties.

Another object of this invention is to provide soldering glass compositions which exhibit reduced crystal formation and improved flow properties upon soldering.

A further object of this invention is to provide soldering glasses of improved crack resistance and increased mechanical strength.

An additional objection of this invention is to provide a crystallizing glass solder composition useful for bonding to aluminum oxide, laboratory glassware and the like at soldering temperatures of up to 450°–600° C.

Upon further study of the specification and appended claims, further objects and advantages of this invention will become apparent to those skilled in the art.

SUMMARY OF THE INVENTION

Briefly, the above and other objects, features and advantages of the invention are obtained in one aspect thereof by providing a glass solder composition comprising a crystallizing soldering glass and an inert refractory material having a negative thermal expansion coefficient in proportions such that the volume of crystals formed in the soldering process is less than about 50 percent of the soldering glass volume, whereby the flowability of the glass solder compositions is not greatly impeded by crystallization.

DETAILED DISCUSSION

It has now surprisingly been found that coherent cracks are not formed if a soldering glass is used as the mixture component which does not crystallize in the usual high volume proportions but rather precipitates a smaller proportion of crystals during the soldering step. Apparently, even a very minor proportion of crystals precipitated from the soldering glass proper is sufficient for avoiding such cracks in the soldering glass. Heretofore, there has not been a full explanation of the phenomenon from which this effect is produced, and accordingly methods of dealing with the phenomenon have not been proposed. In most cases, crystals precipitated from the soldering glasses have a somewhat lower thermal expansion than the glass itself. Therefore, it can be assumed that these crystals modify the stress zone in the vicinity of the beta-eucryptite or other inert particles grains so that they reduce or absorb high stress peaks and thus act as an intermediary between the mixture components. It is also possible that cracks emanating from the surface of the beta-eucryptite are trapped by the crystals and thereby prevented from progressing.

The decisive importance of the amount of crystals precipitated from the solder, specifically with respect to the mechanical strength, will be further explained below with reference to examples. An essential factor for the solder mixture elements of this invention is that the volume proportion of the thus-precipitated crystals in the soldering glass itself is minor, i.e., not greater than 50 percent and preferably less than about 30 percent. In the case of higher volume proportions of precipitated crystals, the advantage of the good flowability of the soldering glass is lost, as has already been set forth above. The difference in soldering behavior between the mixtures of this invention comprising a slightly crystallizing (i.e., not greater than 50 percent) soldering glass and inert refractory particles having a low thermal expansion coefficient as compared to the conventional mixtures from strongly crystallizing soldering glasses and similar admixtures, results from the phenomenon that, while in the prior art mixtures flowing ability is practically commpletely obliterated with the onset of crystallization, in the mixtures of the present invention the volume proportion of the newly formed crystals is so small that the flowability and the remaining properties of the soldering glass are not substantially changed. It will be appreciated that it is difficult to indicate generally applicable quantitative limitations with respect to the amounts of crystals permissible in accordance with this invention. The crystal proportion in conventional crystallizing glass solders is normally more than half the volume, typically greater than 70 percent, since the properties desired therein are attained precisely due to high crystalline proportions. In contrast thereto, crystalline proportions of half or more of the solder glass volume markedly impair the flow characteristics of the compositions of the present invention. Consequently, only those soldering glasses which precipitate less than about half of their volume in crystals are suitable for the mixtures of this invention.

The amount of thus-produced cyrstals depends on the soldering time and temperature employed. However, as experience has shown, the crystallization comes practically to a standstill after attaining a certain degree of crystallization which is principally dependent on the composition of the glass, and this final degree of crystallization does not vary greatly within the technically practicable soldering conditions.

Soldering glasses which precipitate less than half of their volume in crystals can therefore be selected for a given application by simply heating the candidate glass to proposed soldering temperatures to be employed for a period of time sufficient to cause thermal devitrification over a transformation temperature range wherein crystallization takes place, as is known in the art, and visualizing the resultant degree of crystallization in the cooled composition. It will be appreciated that some solder glass compositions may therefore be suitable at certain temperatures and times, but unsuitable at higher temperatures and/or longer times due to the increased crystallization effected under the more severe conditions, but such suitability is easily determined for each given application.

Suitable thermally devitrifiable solder sealing glasses which precipitate less than half of their volume in crystals are readily available in the art and generally exhibit the following properties:

Thermal expansion coefficient $75 \times 10^{-7}$ to $140 \times 10^{-7}$ per °C ($20°$–$300°$ C.);
Softening temperature: $300°$–$380°$ C;
Transformation temperature: $270°$–$360°$ C;

Such solder sealing glasses include but are not limited to the following types of compositions:

| | |
|---|---|
| PbO | 65 – 87% by weight |
| $B_2O_3$ | 7 – 20% by weight |
| $SiO_2$ | 0 – 10% by weight |
| $Al_2O_3$ | 0 – 8% by weight |
| $Bi_2O_3$ | 0 – 20% by weight |
| BaO | 0 – 20% by weight |
| ZnO | 0 – 5% by weight, | wherein oxygen can be partly replaced by fluorine.

Inert refractory substances having a negative coefficient of thermal expansion are likewise known in the art. Generally the negative coefficient of thermal expansion will be about $0 \times 10^{-7}$ to $-50 \times 10^{-7}$ per °C. at $0°$–$300°$ C; this volume will preferably be at least $100 \times 10^{-7}$ units lower than that of the solder glass. Suitable refractory substances include but are not limited to beta-eucryptite or similar Li-Al-silicates and aluminum titanate.

In accordance with a preferred embodiment of the invention, the solder mixtures of this invention consist of lead borate glasses having a low softening temperature, e.g., $300°$–$380°$ C, and containing, in order to prevent an excessive crystallization and to improve the chemical, mechanical and thermal properties thereof, minor amounts, e.g., up to 20 percent, preferably at least 5 percent of $SiO_2$, $Al_2O_3$, BaO or $Bi_2O_3$, and of 5–30% beta-eucryptite ($LiAlSiO_4$) or aluminum titanate ($Al_2TiO_5$) as the inert component having a negative thermal expansion coefficient. Beta-eucryptite and aluminum titanate can be considered as inert refractory substances with respect to the soldering glasses, with which they are mixed, insofar as they are not substantially attacked, dissolved, or otherwise changed by the soldering glass during normal soldering conditions. Particularly advantageous soldering glasses are those having the following composition, in weight percent based on the total composition:

| | |
|---|---|
| PbO | 65 – 87 |
| $B_2O_3$ | 7 – 20 |
| $SiO_2$ | 0 – 10 |
| $Al_2O_3$ | 0 – 8 | wherein up to 15 percent by weight of the oxygen content can be replaced equivalently by fluorine. It is also possible to include additional components in the soldering glass in a total quantity of up to 20 wt. percent, which components enhance or do not increase the low softening temperature by more than 30° C., e.g. ZnO, $Bi_2O_3$, BaO or alkali oxides; however, the ZnO content when present should not be above about 5 percent, because ZnO strongly promotes crystallization.

In accordance with the present invention, it is simple to experimentally determine for each individual case whether given soldering glasses of the aforementioned composition range are suitable for precipitating the minor crystalline proportions in accordance with this invention. This test can be performed by heating the soldering glass in pulverulent form under the conditions to be employed in the particular application and, after recooling, determining the proportion of the newly formed crystals. This determination is accomplished most simply by means of a microscope. Such a test is absolutely necessary, since it is hardly possible to derive the crystal formation to be expected with sufficient accuracy from the composition alone, as will be explained with reference to examples.

Since the soldering glasses to be utilized have low softening temperatures, generally of 300° – 380° C. and consequently exhibit very good flow characteristics which are not impaired by the formation of high crystalline proportions, it is possible to add, according to the present invention, considerable volume proportions, namely up to about two-thirds of the total volume, of inert substances having a negative thermal expansion coefficient. The proportions to be added are selected for each individual case so that a satisfactory harmony is ensured between the thermal expansions of the solder mixture element and the components to be joined together.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees celsius; unless otherwise indicated, all parts and percentages are by weight.

EXAMPLE A

Sealing Aluminum Oxide Housings at Temperatures of at Most 450° C

For this purpose, solder mixtures were prepared from powders of the soldering glasses set forth in Table 1 and 10%, 15%, and 20% by weight of beta-eucryptite, respectively.

TABLE 1

| | (in % by Wt) | | |
|---|---|---|---|
| | Glass A | Glass B | Glass C |
| PbO | 86.5 | 82.0 | 86.0 |
| $B_2O_3$ | 7.5 | 10.0 | 11.2 |
| $SiO_2$ | 1.0 | 5.0 | 2.2 |
| $Al_2O_3$ | 4.0 | 3.0 | 0.6 |
| BaO | 1.0 | — | — |

Cylindrical pressed components having a diameter of 8 mm. and a height of 8 mm. were produced from these mixtures in order to test the flow behavior. These pressed components were maintained at a temperature of 450° C. for 10 minutes. Thereafter, the extent to which the samples had spread out on their substrate by flowing was measured (Table 2).

TABLE 2

| Beta-Eucryptite | Diameter of Spread of Flowed Material (mm.) | | |
|---|---|---|---|
| (in % by Wt.) | Glass A | Glass B | Glass C |
| 10 | 8.2 | 11.6 | 13.0 |
| 15 | 7.4 | 11.0 | 12.0 |
| 20 | 7.4 | 10.5 | 11.3 |

The mixtures containing glass A showed hardly any spread due to flowing in this test. As found by a microscopic investigation of the samples, this is due to extensive crystallization. The mixtures with glasses B and C, in contrast thereto, showed satisfactory flow characteristics. Melt stress measurements in a glass substrate, the expansion of which ($72 \cdot 10^{-7}$/degree) comes close to that of $Al_2O_3$, showed that the mixtures of glass B with 15 percent by weight of beta-eucryptite and glass C with 20 percent by weight of beta-eucryptite are well adapted in their thermal expansions to the thermal expansion of $Al_2O_3$. Round disks made from these two mixtures and subjected to the same heat treatment as done above in the flow experiments were then measured with respect to their flexural-tensile strength. It was found that the mixture with soldering glass B failed even at stresses of below 100 kg./cm², while the mixture with soldering glass C bore stresses of up to about 450 kg./cm². The low strength of the round discs containing glass B is caused by the presence of numerous cracks in the soldering glass — high eucryptite mixture composite, which are detectable by a microscope. Characteristically, no newly formed crystals from the soldering glass were observed herein. The mixture composite containing glass C exhibited such crystals in a volume proportion of about 10% (estimated according to the microscopic observation of the substance) and did not show any cracks. The strength of these mixture elements is approximately twice as great as even that of elements from the pure soldering glass C without an admixture of high eucryptite (200–250 kg./cm²). The solder mixture of 80 percent by weight of glass C and 20% by weight of beta-eucryptitie is therefore well suitable for bonding ceramic components of $Al_2O_3$ at temperatures around 450° C. The volume proportion of the beta-eucryptite in this mixture is about 45 percent.

EXAMPLE B

Bonding of Components of a Glass Having a Thermal Expansion of 42 · $10^{-7}$/Degree (20°–300° C.) and a Transformation Temperature of 590° C.

Plates from a borosilicate-glass having the dimensions of 30 × 30 × 5 mm. were coated with solder mixtures of glass C (Table 1) with 25 percent, 30 percent, and 35 percent by weight respectively of beta-eucryptite in a layer thickness of about 1 mm., and then covered with a second plate of the same glass. The two plates were then heated in a furnace to 550° C., left for 15 minutes at this temperature and then cooled. The solder layer containing 25 percent by weight of beta-eucryptite was strongly fissured after cooling, i.e., its thermal expansion was still too high as compared to the glass plate. The solder layer containing 30 percent by weight of beta-eucryptite had wetted both plates completely and, after coling, did not show any cracks. A photoelastic stress inventigation showed only a very weak compressive stress of about 10 kg./cm² in the two glass plates. The solder layer with 35 percent by weight of beta-eucryptite showed very poor flow characteristics and had wetted the glass plates only at some places, in this case, the glass plates were under tensile stress.

Satisfactory bonds between components of the above-mentioned glass can, therefore, be obtained with a solder mixture of 70 percent by weight of glass C and 30 percent by weight (60 percent by volume) of beta-eucryptite at soldering temperatures lying markedly below the transformation temperature of the components to be joined.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for soldering with a solder glass composition comprising a thermally devitrifiable solder glass and an inert refractory compound having a negative coefficient of thermal expansion, the improvement which comprises discontinuing the soldering before 50 percent of the total volume of said composition crystallizes, and wherein said composition consists essentially of:

a. a thermally devitrifiable solder glass having a softening point of about 300°–380° C, said solder glass having the following composition (in percent by weight):

| | |
   |---|---|
   | PbO | 65 – 88 |
   | $B_2O_3$ | 7 – 20 |
   | $SiO_2$ | 0 – 10 |
   | $Al_2O_3$ | 0 – 8 |
   | $Bi_2O_3$ | 0 – 20 |
   | BaO | 0 – 20 |
   | ZnO | 0 – 5 |
   | total $Bi_2O_3$, BaO and ZnO | 0 – 20 | wherein up to 15 percent of the oxygen can be replaced by fluorine, and b. beta-eucryptite, wherein the beta-eucryptite constitutes 5 – 30 percent by weight and less than about two-thirds by volume of the total solder glass composition.

2. A process according to claim 1, said solder glass consisting of PbO, $B_2O_3$, $SiO_2$ and $Al_2O_3$ wherein up to 15 percent of the oxygen is optionally replaced by fluorine.

3. A process according to claim 1, said composition consisting essentially of about 15–30 percent by weight pulverized beta-eucryptite.

4. A process according to claim 3, said solder glass consisting essentially of in percent by weight:

| | |
   |---|---|
   | PbO | 83 – 88 |
   | $B_2O_3$ | 9 – 13 |
   | $SiO_2$ | 1 – 4 |
   | $Al_2O_3$ | 0 – 2. |

5. A process according to claim 1, said composition being about 80 percent by weight solder glass and 20 percent by weight beta-eucryptite.

6. A process according to claim 1, comprising soldering an aluminum oxide ceramic at a temperature of about 450°C. with a solder glass composition consisting essentially of:

a. about 80 percent by weight of a soldering glass consisting essentially of PbO, $B_2O_3$, $SiO_2$ and $Al_2O_3$ wherein up to 15 percent of the oxygen is optionally replaced by fluorine; and b. about 20 percent by weight beta-eucryptite.

7. A process according to claim 1, comprising soldering glasses which have a thermal expansion coefficient of about $30 \times 10^{-7}$ to $50 \times 15^{-7}$ per °C. at a temperature of up to 600° C.

* * * * *